Patented July 4, 1950

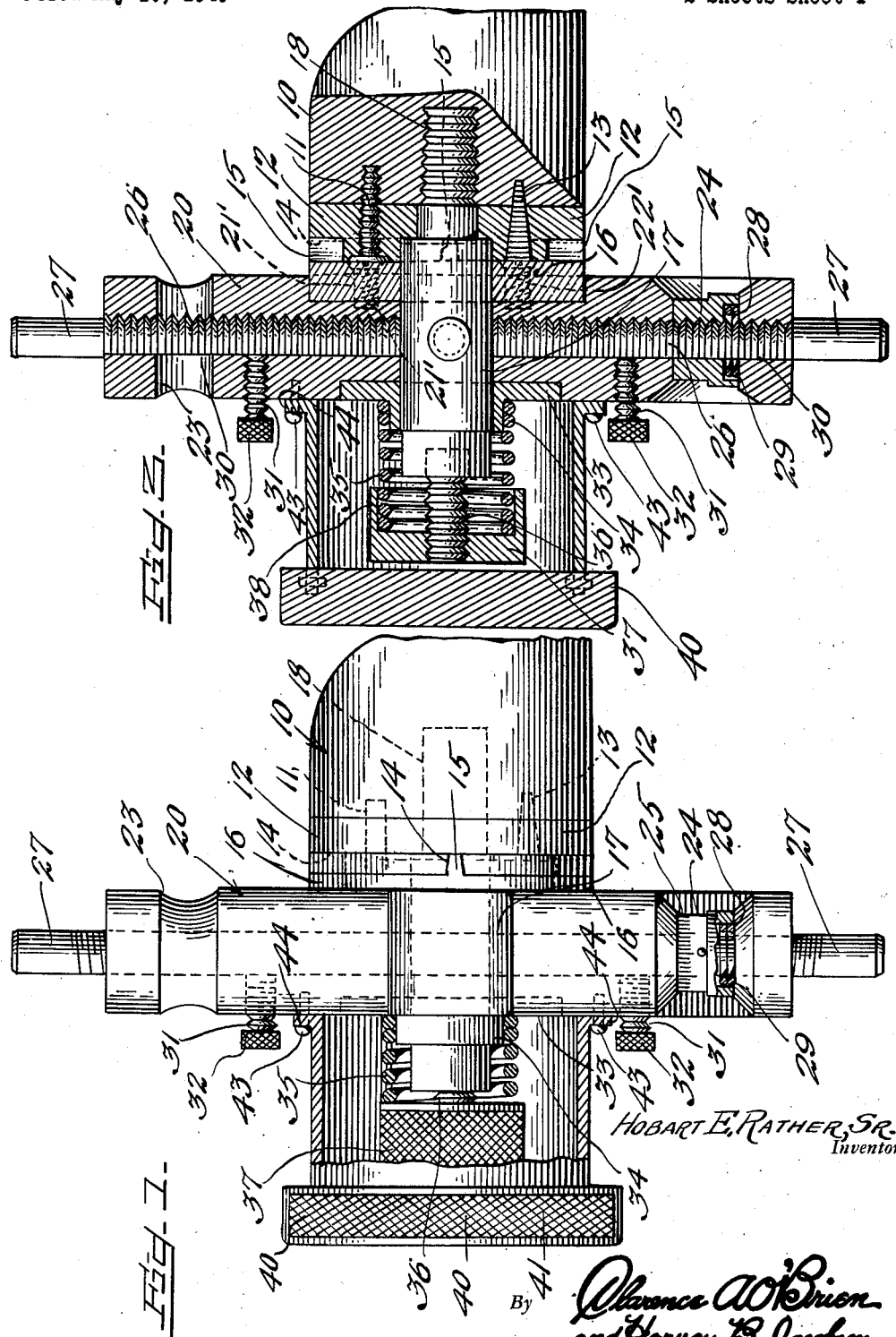

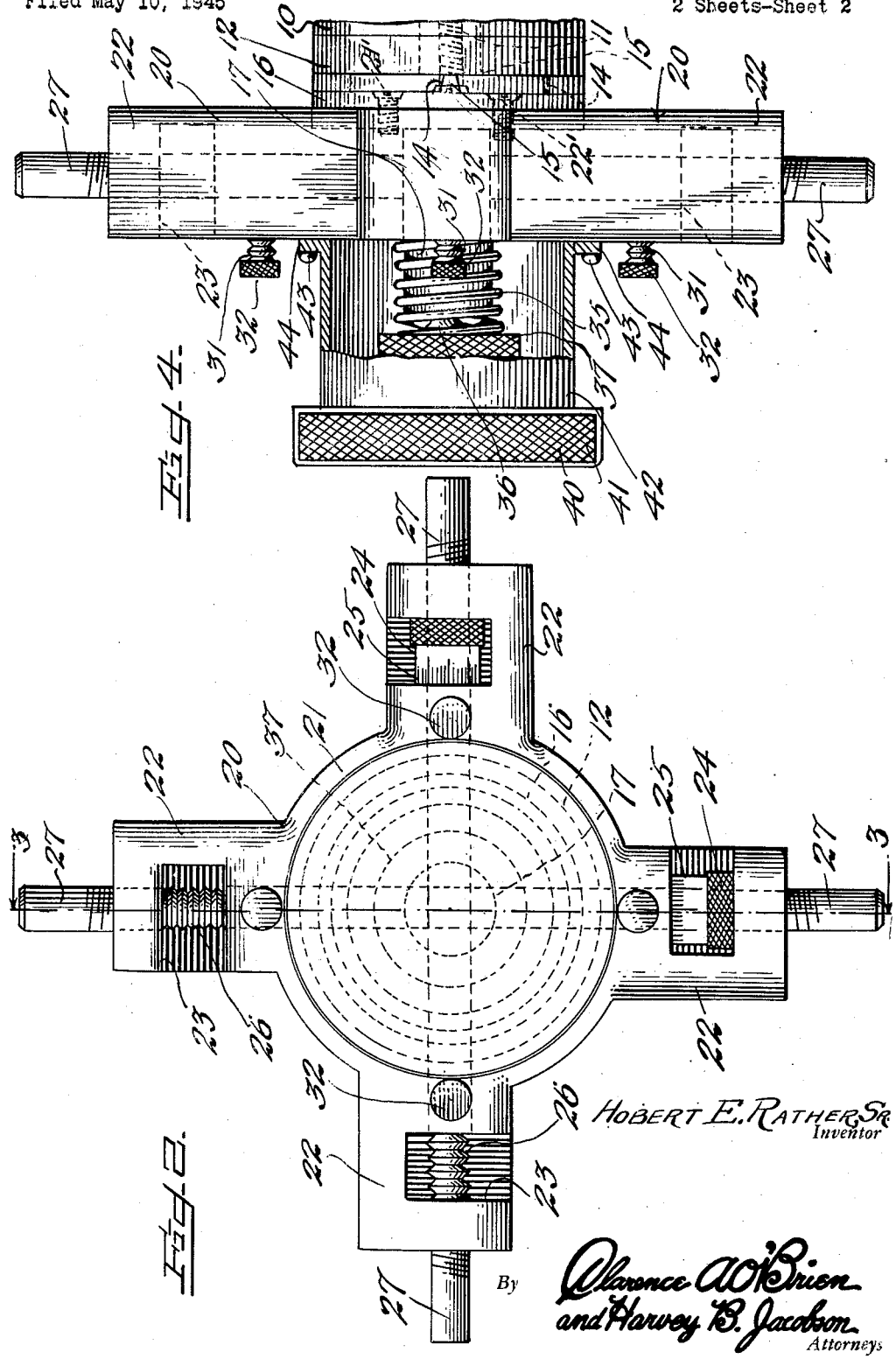

2,514,090

UNITED STATES PATENT OFFICE 2,514,090

TURRET LATHE STOP

Hobart E. Rather, Sr., Bristol, Tenn., assignor of one-fourth to James R. Felty, Bristol, Tenn.

Application May 10, 1945, Serial No. 592,976

2 Claims. (Cl. 82—34)

This invention relates to a turret lathe stop, and more particularly to such a lathe stop embodying a micrometer in association with a turret stop for providing a plurality of readily positionable micrometrically accurate stops to be utilized in conjunction with a lathe when a plurality of different dimensions must be held.

A primary object of this invention is the provision of an improved turret micrometer lathe stop characterized by a plurality of micrometrically adjustable stop members positioned in a turret and having means whereby any required stop member may be positioned to stop the lathe as desired.

A further object of the invention is the provision of such a device provided with a plurality of stop members, each being individually micrometrically adjustable and having means whereby the exact positioning of the requisite stop member may be accomplished substantially automatically.

An additional object of the invention is the provision of such a device which will be sturdy and durable in construction, reliable and efficient in operation, and relatively simple and inexpensive to manufacture, assemble and install.

Other objects reside in the combinations of elements, arrangements of parts, and features of construction, all as will be more fully pointed out hereinafter and disclosed in the accompanying drawings, wherein is shown a preferred embodiment of this inventive concept.

In the drawings, wherein like reference characters are used to denote like parts:

Figure 1 is a side view partially in elevation and partially in section of one form of device embodying features of this invention.

Figure 2 is a front elevational view of the device shown in Figure 1, certain parts thereof being omitted, and certain other concealed parts being indicated by dotted lines.

Figures 3 is a sectional view taken substantially along the line 3—3 of Figure 2.

Figure 4 is a fragmentary detail partially in elevation and partially in section, showing certain constructional elements.

Having reference now to the drawings, there is generally indicated at 10 a lathe bed clamp to which is secured, as by means of flat-headed screws 11, a female index plate 12. A taper pin 13 is provided to insure rigidity of the assembly. The index plate 12 is provided with a plurality, illustratively four, of grooves 14 adapted to be engaged by lugs 15 carried by a male index plate 16. A stud 17 extends through suitable apertures in both the index plates 16 and 12, being secured, as by a threaded extremity 18, in a suitable threaded aperture in clamp 10. The male index plate 16 is secured to a main body portion 20, as by flat-head screws 21' and set screws 22'.

As best shown in Figure 2, the body 20 is comprised of a relatively cylindrical portion 21, from which extend radial projecting members 22, in the illustrative embodiment shown there being four of such projections, positioned at right angles with respect to each other, and each of which is provided with a channel or groove 23, within which is positioned a knurled nut 24 provided with micrometric markings 25 adapted to register with suitable indicating points on the body portion, the nuts being positioned for threaded engagement with the threaded stems 26 of stop members 27. In Figure 2, certain of the nuts are omitted for clarity of illustration.

As best shown in Figure 3, each of the nuts 24 is provided with a channel 28 within which is positioned a compression spring 29 biasing the nut inwardly with respect to the groove 23 towards the body portion 20, the spring 29 being designed to take up any end play, such as might be occasioned by wear or the like, to obviate inaccuracy in the adjustment of the stops.

As best shown in Figure 3, each of the threaded shanks 26 is provided with a flat side 30 adapted to be engaged by the extremity of a set screw 31 having a knurled head 32 extending exteriorly of the device, a screw being positioned in each protuberance 22 for engagement with each shank 26.

The body 20 has a suitable recess in the forward side thereof adapted to provide a seat for a pressure plate 33 provided with a flange 34 adapted to be engaged by one end of a compression spring 35 surrounding the stud 17. A threaded extension 36 of the stud 17 has mounted thereon a cap nut 37 provided with an interior recess 38 within which the other end of the spring 35 is seated. Thus, it will be seen that the pressure of the spring 35 normally biases the body 20 and its associated male index plate 16 inwardly with respect to the female index plate 12 and the clamp 10.

A handle member 40 knurled, as at 41, provided with a depending skirt 42, surrounds the spring and cap nut assembly previously described and is secured to the body portion 20, as by means of screws 43 passed through suitable apertures in lugs 44 turned at right angles to the skirt.

From the foregoing, the operation of the device should be readily understandable. When it is desired to use the lathe stop for operation on a piece of work requiring stops and at various distances to accommodate various dimensions of the work, each of the stop members 27 is adjusted by means of its associated nut 24, the adjustment being accurate to thousandths of an inch by virtue of the micrometer arrangement of the nut, to the desired dimension. An outward pull on the handle will disengage the lugs of the male index plate from the corresponding grooves of the female index plate, and the body assembly and its associated male index plate may be rotated freely about the stud 17 until the desired stop is in position. Release of the handle will permit the grooves and lugs of the femal and male index plates, respectively, to engage, thus accurately centering the selected stop with respect to the mechanism to be actuated thereby. Obviously, when the particular machine operation requiring the particular stop has been completed, the handle may again be pulled outwardly against the pressure of the spring 35, which normally serves to hold the parts in related assembly, and an additional stop juxtaposed in the stop mechanism of the lathe.

From the foregoing it will now be seen that there is herein provided a device accomplishing all of the objects of the invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. A lathe turret stop carried by a lathe frame, comprising a base, a turret having a plurality of individually adjustable lathe stops rotatably supported by an axle extending through said turret and secured to said base, a pair of detachable index plates secured respectively to said base and to one side of said turret for rotationally positioning said turret upon said base in selective position, spring means surrounding said axle bearing against the other side of said turret, and a retaining and adjusting cap abutting said spring and having screw threaded engagement with said axle, and a combined housing and handle secured to said other side of said turret and enclosing said spring and adjusting cap, and a knurled knob on said housing for disengaging and relatively rotating said index members.

2. A lathe turret stop carried by a lathe frame, comprising a base, a turret having a plurality of individually adjustable lathe stops rotatably supported by an axle extending through said turret and secured to said base, a pair of detachable index plates secured respectively to said base and to one side of said turret for rotationally positioning said turret upon said base in selective position, spring means surrounding said axle bearing against the other side of said turret, and a retaining and adjusting cap abutting said spring and having screw threaded engagement with said axle, said spring engaging a pressure plate, said plate seating in a recess in said other side of said turret and having an axial cylindrical flange extending within said spring and slidably embracing said axle for alining and centering said spring.

HOBART E. RATHER, Sr.

REFERENCES CITED

The following references are of record in the file of this patent:

UNITED STATES PATENTS

| Number | Name | Date |
|---|---|---|
| 1,480,522 | Ferguson | Jan. 8, 1924 |
| 1,551,039 | Magem | Aug. 25, 1925 |
| 1,690,568 | Bullard, Jr. | Nov. 6, 1928 |
| 2,202,117 | Muller | May 28, 1940 |
| 2,365,196 | Honegger | Dec. 19, 1944 |
| 2,368,408 | Brooking | Jan. 30, 1945 |